United States Patent [19]

Dean et al.

[11] 4,337,612
[45] Jul. 6, 1982

[54] ROW CROP UNIT

[75] Inventors: Earl E. Dean, Warren; Marshall L. Quade, Pinckney, both of Mich.; William F. Temple, Albany, Ga.

[73] Assignee: Massey-Ferguson Inc., Detroit, Mich.

[21] Appl. No.: 210,882

[22] Filed: Dec. 28, 1980

[51] Int. Cl.³ .................... A01D 67/00; A01D 45/00
[52] U.S. Cl. .......................................... 56/98; 56/119
[58] Field of Search ................ 56/98, 106, 119, 14.3, 56/108

[56] References Cited

U.S. PATENT DOCUMENTS

| | | | |
|---|---|---|---|
| 1,928,868 | 10/1933 | Poien | 56/119 |
| 2,210,341 | 8/1940 | Rund | 56/119 |
| 2,637,436 | 5/1953 | Andrews | 56/119 |
| 3,059,703 | 10/1962 | Pearman | 56/106 |
| 3,271,940 | 9/1966 | Ashton et al. | 56/119 |
| 3,339,354 | 9/1967 | Kessler | 56/98 |
| 3,352,093 | 11/1967 | Procter | 56/98 |
| 3,585,789 | 6/1971 | Blanshine et al. | 56/98 |
| 3,646,737 | 3/1972 | Grant | 56/106 |
| 3,670,482 | 6/1972 | Blanshine et al. | 56/98 |
| 3,736,733 | 6/1973 | Fell et al. | 56/98 |
| 3,791,117 | 2/1974 | Lawrance | 56/98 |
| 3,854,272 | 12/1974 | Lane et al. | 56/98 |
| 3,940,913 | 3/1976 | Wallenfang et al. | 56/98 |
| 4,115,983 | 9/1978 | Barnes et al. | 56/98 |
| 4,143,757 | 3/1979 | Wallenfang | 56/98 |
| 4,227,366 | 10/1980 | Pucher | 56/106 |

Primary Examiner—Paul J. Hirsch
Attorney, Agent, or Firm—John C. Thompson

[57] ABSTRACT

A row crop unit (10) is provided with cooperating pairs of molded belts (40), the belts (40) being supported from overhead frame members (20, 22, 24, 26) whereby the build-up of trash within the unit is minimized. A cutoff mechanism (100) is provided, the mechanism (100) being driven by a drive mechanism (110, 112, 114, 116, 118, 120) independent of the belts (40) whereby high driving torques on the belts (40) are avoided. The forward ends of the belts (40) are carried by spaced apart sprockets (56) located forwardly of the cutoff mechanism (100) to insure that standing crop material is properly gathered and engaged prior to severing by the cutoff mechanism (100).

7 Claims, 6 Drawing Figures

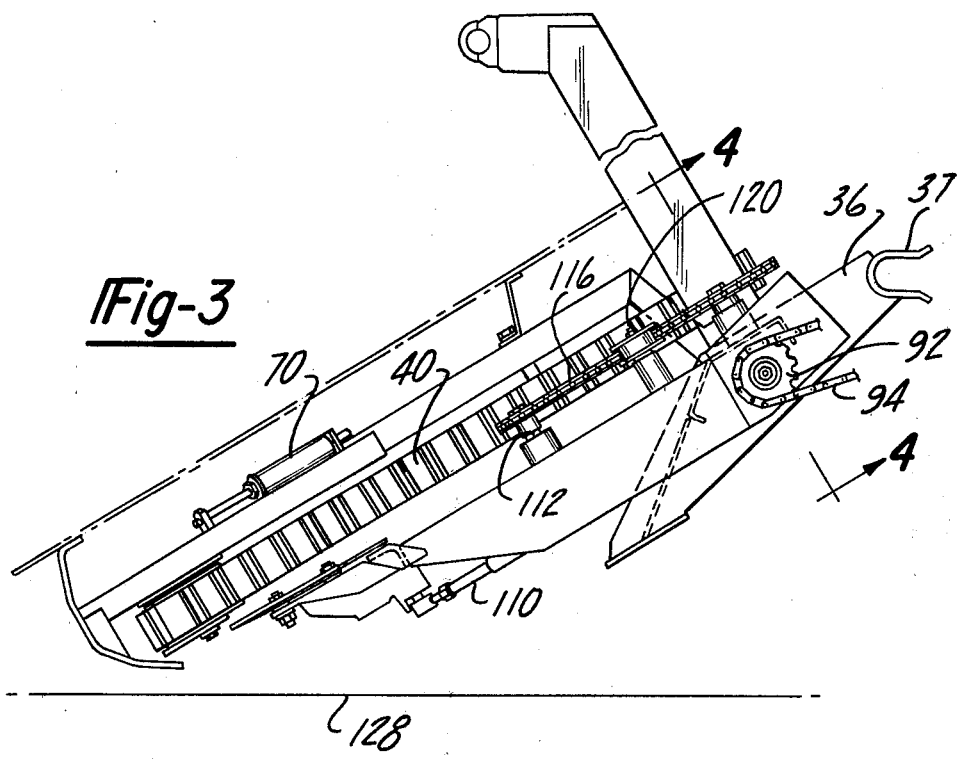
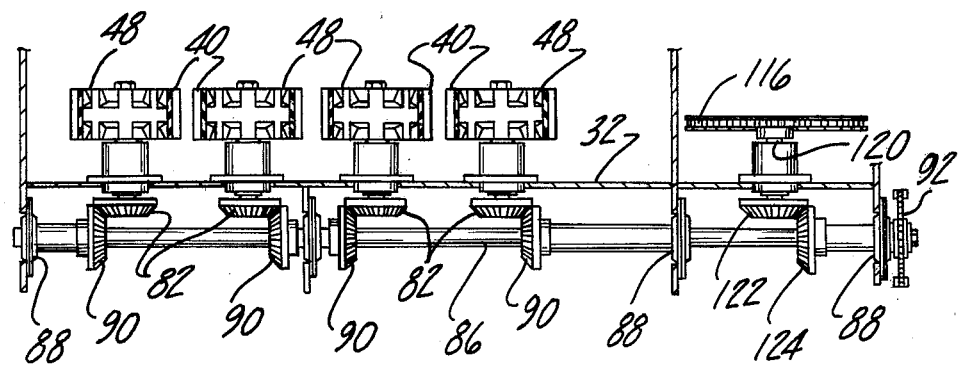

ROW CROP UNIT

FIELD OF THE INVENTION

The present invention relates generally to row crop units for crop harvesting machines, and more particularly to a row crop unit of the type employing a plurality of endless belts.

BACKGROUND OF THE INVENTION

It is customary to provide a row crop unit on a forage harvester when standing corn is to be processed into silage. The row crop unit may engage 1, 2 or more rows of corn. For each row of standing corn a cutting mechanism and a gathering and conveying mechanism is provided. Various types of conveying mechanisms have been employed, but the most widely accepted type embodies two side by side metal conveyer chains provided with lugs, the chains engaging crop material between adjacent rearwardly running runs. The chains may be provided with metal lugs, or, as shown in U.S. Pat. No. 3,339,354, resilient flexible lugs. When chains and lugs of conventional design are employed, it is necessary to provide upper and lower conveying chains as the crop material is not firmly engaged between the chains. However, when using chains provided with elements, such as shown in U.S. Pat. No. 3,339,354, it is only necessary to provide one pair of side by side conveyor chains for each row as the crop material is gripped between adjacent runs of the conveyor. A primary disadvantage of both of these forms of conveying mechanisms is that if one of the chains breaks, it in turn may enter into the cutting mechanism of the forage harvester causing severe damage to the knives, the knife supports, the shear bar, etc.. Additional disadvantages of these conveying mechanisms are high wear rates, noisy operation, high weight and relatively high cost.

In order to overcome the foregoing disadvantages, it has been proposed in U.S. Pat. Nos. 3,854,272 and 3,940,913 to utilize a gathering mechanism utilizing molded rubber belting of the type which is occasionally referred to as snowmobile belting. The molded belting has drive lugs on one side of the belt and crop engaging or gathering lugs on the other side.

Prior art designs which have utilized molded belting, while overcoming many of the disadvantages of chain type belts, have experienced other problems. The basic problem is that these belts tend to jump the driving or idler sprockets, or they tend to shift thereon causing damage to the drive and gathering lugs which will eventually result in failure of the belts. One of the reasons for these problems is that these belts have been utilized in prior art designs to drive a rotary cutting mechanism which severs the standing crop. Since the rotary cutting mechanism requires a fairly high torque, particularly when the cutting mechanism is not properly adjusted, the belt which drives the cutting mechanism tends to elongate to the point where it jumps off the sprockets or breaks. Also, the drive belt may be thrown from the sprockets if the cutting mechanism jams. A second reason for these problems arises from trash clearance. Thus, in prior art designs the trash tends to build-up on the cutting mechanism, the sprockets, and the supporting frame disposed below the belts, the accumulated trash causing the belts to jump the sprockets or to stretch to a point where they no longer perform in a satisfactory manner. Another reason for these problems is that prior art tensioning mechanisms fail to maintain proper tension of the belts.

Another disadvantage of prior art designs which utilize molded belting to drive a rotary cutting mechanism is that it is not possible to properly locate the forward ends of adjacent belts with respect to the cutting mechanism. Thus, when one of the belts is utilized to drive a rotary cutting mechanism it is not possible to properly gather and engage the crop material between adjacent rearwardly running sides of the cooperating gathering belts. It is desirable that crop material be firmly engaged before cutting, since if the material is not engaged between adjacent runs of the conveying mechanism the crop material may fall to the ground when it is cut and not enter into the harvester. In addition, with the prior art constructions, the belts cannot properly gather the crop material.

OBJECTS AND SUMMARY OF THIS INVENTION

It is a principal object of the present invention to overcome the disadvantages of known prior art row crop unit constructions employing molded belting.

More specifically, it is an object of the present invention to provide an improved row crop unit construction of the type employing molded belting which will eliminate the build-up of trash within the row crop unit, which trash could interfere with the proper running of the molded belting.

It is another object of the present invention to provide an overhead cantilevered frame construction for cooperating crop conveying molded belts, and a crop severing mechanism disposed rearwardly of the forward ends of the conveying belts, which crop severing mechanism is driven by a mechanism independent of the crop conveying belts.

It is a further object of the present invention to provide a row crop unit construction of the type using molded belts wherein the forward ends of the belts are so oriented that the crop material is properly gathered and is engaged between cooperating belts prior to the severing of the crop material.

Other objects and advantages of this invention will become apparent from the following detailed description taken in conjunction with the accompanying drawings in which a preferred form of this invention is illustrated.

BRIEF DESCRIPTION OF THE FIGURES

FIG. 3 is a view taken generally along the line 3—3 in FIG. 2.

FIG. 4 is a view taken generally along the line 4—4 in FIG. 3 illustrating the driving mechanism for the endless belts.

DETAILED DESCRIPTION

In the following description right hand and left hand reference will be determined by standing to the rear of the machine and facing its direction of travel.

Figure 1:
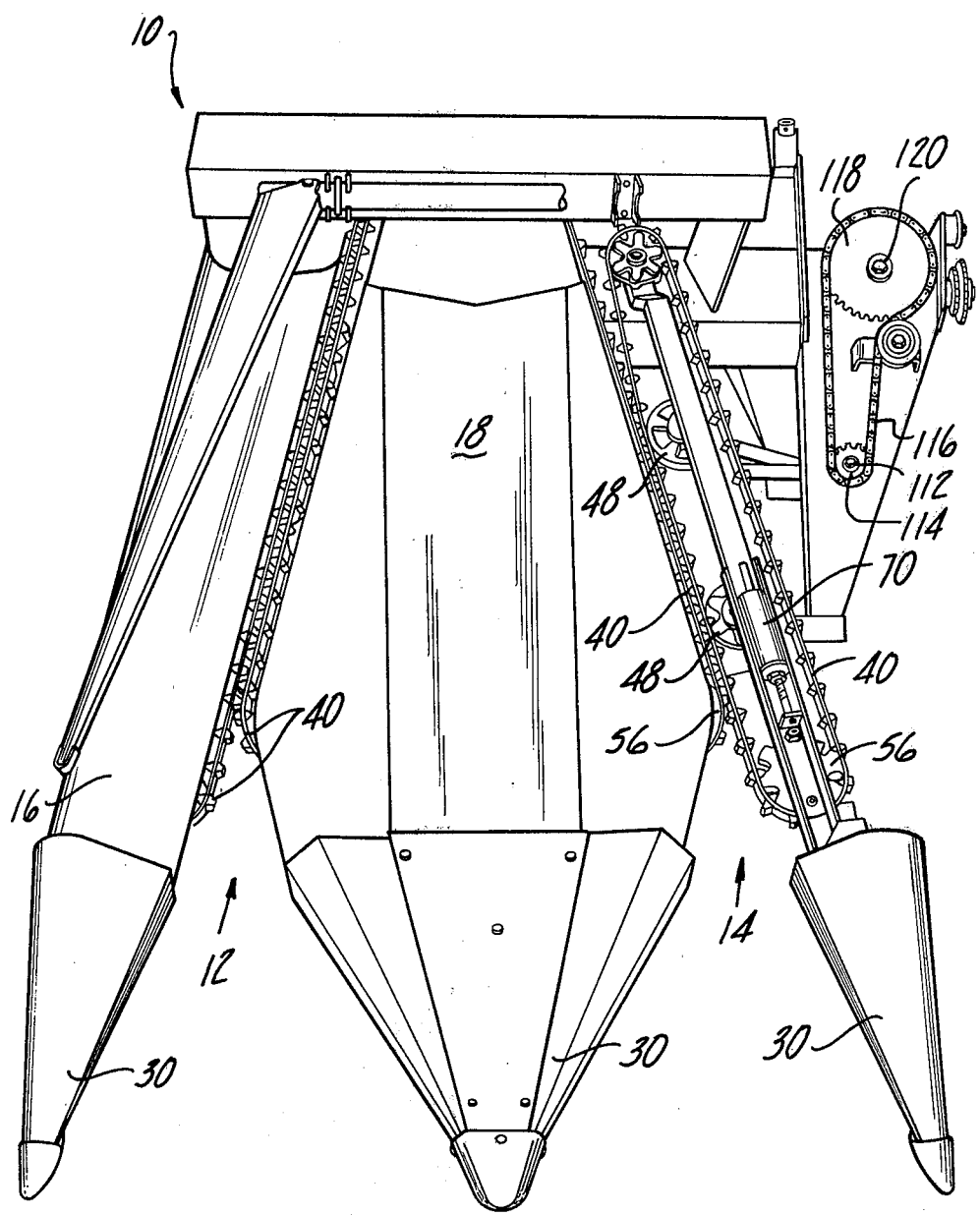
FIG. 1 is a view taken from the front and above the forward end of a row crop unit of the type adapted to harvest two rows, a portion of the sheet metal disposed above the conveying belts not being shown.

The row crop unit in which the principals of the present invention have been incorporated is indicated generally at 10 in FIG. 1. This unit is capable of harvesting two standing rows and thus is provided with right and left stalk receiving passageways 12, 14. The unit further includes right and left fenders, only the right fender 16 being shown. This unit further includes a central section 18. The fenders and central section 18 are in turn supported by forwardly and downwardly extending frame members shown in FIG. 2. Thus, the right fender is supported by right frame member 20, the left fender is supported by a left frame member 22, and the center section is supported by right and left intermediate frame members 24, 26, respectively. Each of the frame members 20, 22, 24, 26 terminates in a forwardly located skid member 28. Floating snouts 30 are in turn secured to the skid members 28. The rearward ends of the frame members 20, 22, 24, 26 are interconnected in turn to a cross frame member 32 in a manner more fully set forth below. Right and left outrigger frame assemblies 34, 36 are secured to the ends of the cross frame member 32. The outrigger frame assemblies extend rearwardly and each is provided with a clevis 37 (FIG. 3) which may be secured to a cross shaft on a forage harvester by a pin. The forward ends of the outrigger frame assemblies also support an intermediate cross frame member 38 to which intermediate portions of the fore and aft extending frame members 20, 22, 24, 26 are secured by suitable brackets 39 (only two of which are shown).

Figure 5:
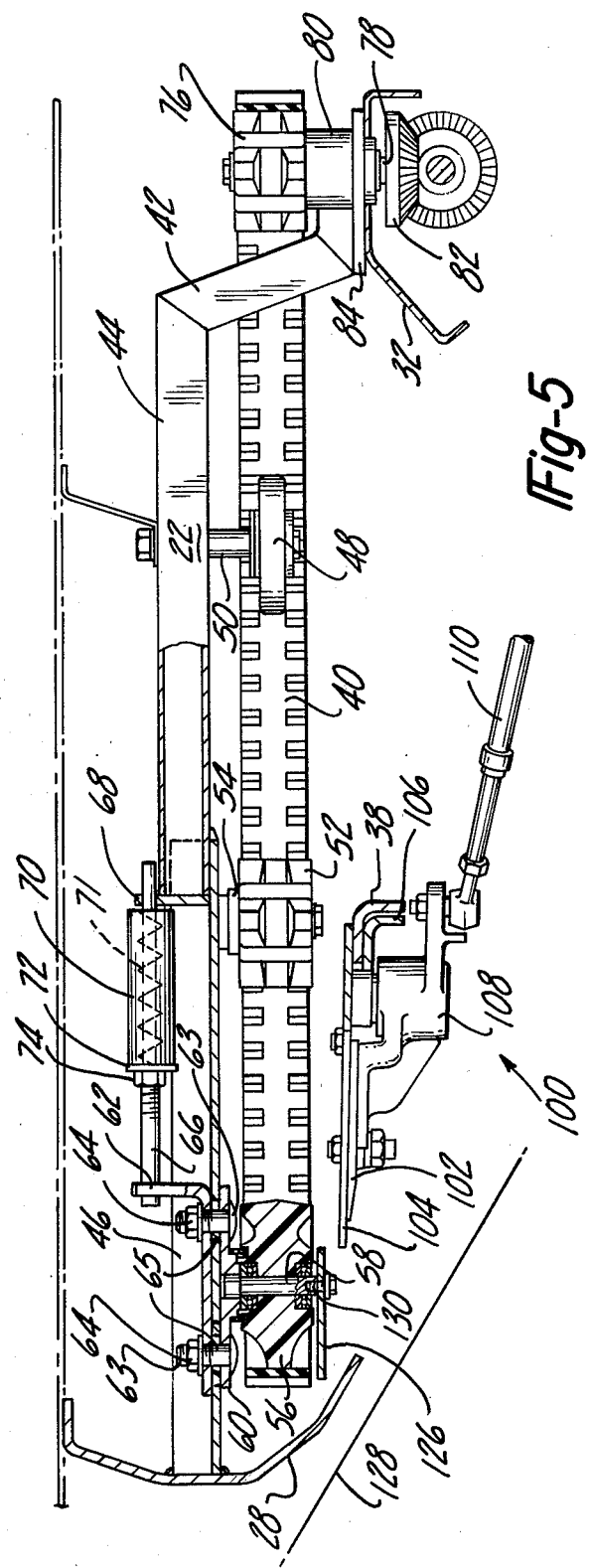
FIG. 5 is a view taken generally along the line 5—5 in FIG. 2.

Each of the fore and aft frame members 20, 22, 24, 26 supports an endless belt 40. The manner in which these belts are mounted can best be appreciated from an inspection of FIG. 5. Each fore and aft frame member 22 is provided with an initial upwardly and forwardly extending section 42, an intermediate downwardly and forwardly extending box section 44, and a forward channel section 46 to which the skids 28 are secured. An idler 48 is carried by the lower end of an idler shaft 50 whose upper end is secured to the intermediate section 44. Similarly, an intermediate idler sprocket 52 is carried by the lower end of an idler shaft 54 which is also carried by the frame 22. As can be seen from FIG. 2 the idlers 48 and 52 are staggered to provide belt relief when large volumes of crop or groups of corn ears are held between the belts and travel rearwardly.

As the belts are essentially inelastic it is necessary to provide a spring loaded tensioning mechanism. Thus, a tensioning mechanism is provided, the tensioning mechanism including a tensioning idler sprocket 56 rotatably carried on an idler shaft 58 whose upper end is secured to a plate 60. The plate 60 is in turn secured to an L-shaped plate 62 by means of carriage bolts 63 which pass through slots (no number) in the bottom of the channel section 46 and nuts 64. Spacers 65 are disposed within the slots about bolts 63. The tensioning mechanism further includes a shaft 66 welded at its forward end to the L-shaped member 62, the shaft having an intermediate threaded portion, and a rear end portion which passes through an aperture in abutment 68 at one end of the box section 44. A tube 70 surrounds a coil spring 71 which has one end bearing against abutment 68 and the other end bearing against washer or stop 72 which is held in adjusted position by nut 74. It can be appreciated that the tension on belt 40 can be adjusted merely by adjusting the nut 74 until the desired tension within the belt 40 is attained.

Figure 2:
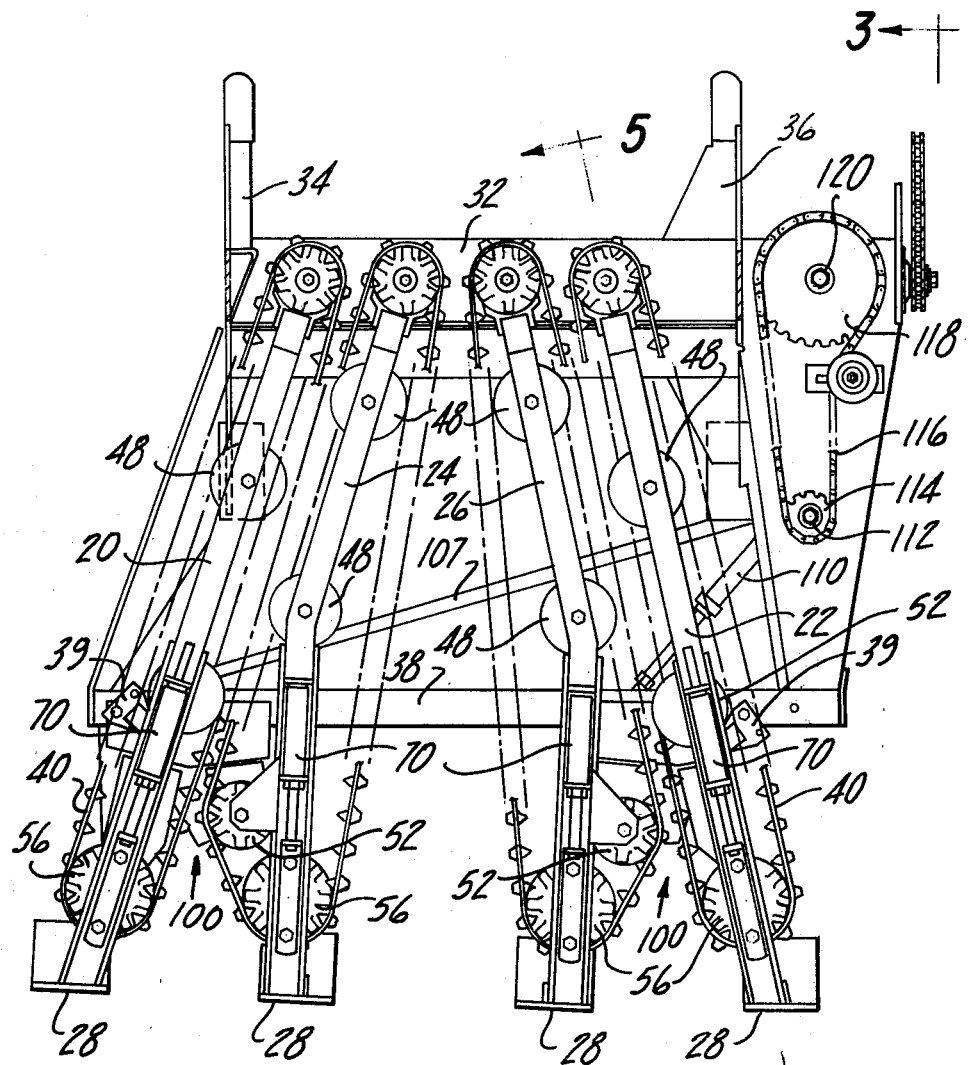
FIG. 2 is a view similar to FIG. 1 in which all sheet metal, including the forward snouts, has been removed.

As can be seen from FIG. 2 the forward tensioning idler 56 on frame members 24 and 26 is spaced away from the adjacent tensioning idler on frame members 20 and 22. However, the idler sprocket 52 on frame members 24 and 26 is spaced closely adjacent the belt carried by the adjacent frame member. This construction insures proper gathering of the crop material.

Each of the molded belts 40 is driven from a drive sprocket 76 disposed at the rear end of the belt. Each of the sprockets 76 is in turn mounted on the upper end of a vertically extending hex drive shaft 78 which passes through the cross frame member 32 and an associated bearing housing 80, the shaft having a bevel gear 82 mounted on its lower end. By employing a hex shaft proper timing of the belt lugs is maintained. As can best be seen from FIG. 5 the rear end of section 42 of the fore and aft extending frame members 20, 22, 24, 26 is rigidly secured to a forward extension of the bearing housing and support 80. The housing and support 80 is provided with a lower outwardly extending flange 84 which is in turn fastened to the cross frame member 32 by threaded fasteners (not shown) for limited adjustable movement about the axis of the shaft 78.

It should be noted at this point that the row crop unit may be adjusted for differing widths of row crop spacing. Thus, the sheet metal of the center section 18 and the associated snout 30 can be telescoped to provide for differing row spacings. The support frame members 20, 22, 24, 26 can be adjusted by loosening the fasteners which secure the flange 84 to the cross frame member, by securing the mounting brackets 39 to differing locations on the intermediate cross frame member 38, and by then tightening the flange 84 fasteners.

A cross shaft 86 (FIG. 4) is mounted within the cross frame member 32 by bearing blocks 88, the cross shaft 86 in turn carrying driving bevel gears 90 which mesh with the bevel gears 82. The shaft 86 is in turn driven through sprocket 92 and chain 94, the chain 94 in turn meshing with another sprocket (not shown) concentric with the pivot shaft which receives the trunnion 37. As can be seen from FIG. 4 adjacent pairs of belts 40 will be driven in opposite directions, the adjacent runs of a pair of associated belts moving rearwardly, thus, engaging and conveying the lower ends of crop material towards the forage harvester.

As the crop enters the row crop unit it is severed by a cut off mechanism indicated generally at 100. Each of the cut off mechanisms employs an oscillating sickle 102 and stationary side knives 104. The side knives are carried by a generally U-shaped bracket 106 whose rearward end is secured to the intermediate cross frame member 38. An intermediate portion of the bracket carries a downwardly extending pivot pin which receives the sickle holder 108. The sickle holder 108 is caused to oscillate from a pitman arm 110. The other end of each pitman arm 110 is secured by a bearing to a crank (not shown) carried by a shaft 112. The shaft 112 carries a sprocket 114 which is rotated by chain 116 which, in turn, passes over a driving sprocket 118. The drive sprocket 118 is in turn mounted on a shaft 120 which carries a bevel gear 122 which is in turn driven by a bevel gear 124 mounted on the cross shaft 86.

Figure 6:
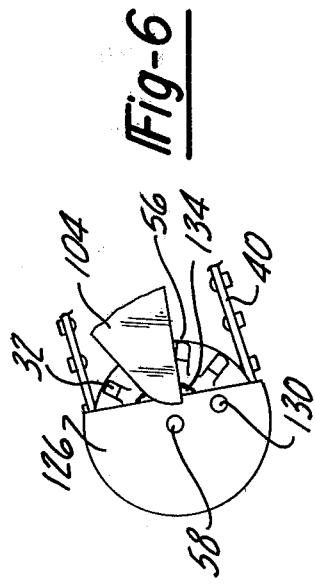
FIG. 6 is a bottom view of the forward idler sprocket assembly and the underlying portion of the cutting mechanism shown in FIG. 5.

It is a feature of this invention that adequate clearance is provided below the idler sprockets 48, 52, 56 to permit trash to fall to the ground. In this connection, it should be noted that shaft 58 carries a belt retainer 126. As can be seen from FIG. 6 the retainer 126 is so shaped that most of the rearward portion of the forward idler 56 is exposed. While a portion of one of the side knives 104 extends below the idler 56 there is adequate clearance for trash to clear the knife 104 and fall to the ground, indicated by line 128 in FIGS. 3 and 5. The belt retainer additionally carries a pin 130 (FIG. 6) which acts to discharge material received in the groove between the lugs 132 and hub 134 of the sprocket. Belt retainers (not shown) may also be provided for other sprockets, such as sprocket 76. Similarly, a scraper may also be employed for drive sprocket 76, which scraper could be in the form of a plate extending upwardly and rearwardly from section 42.

The operation of the row crop unit described above should be obvious to those who have ordinary skill in the art. By utilizing a cut off mechanism 100 which is driven independently of molded belts 40 it is possible to achieve significantly higher life of the belts. In addition, by employing an overhead fore and aft extending frame 20, 22, 24, 26 for each of the belts 40 it is possible to provide trash clearance to the ground whereby undue trash build-up within the row crop unit will be avoided, also significantly improving the performance of the belts. By locating the cut off mechanism in the position illustrated in the figures it is possible to engage the crop material as the initial severing action takes place. If the severing were to take place before the crop material is engaged, it is possible for the crop material to fall down prior to engagement by the belts. This is particularly true when operating the row crop unit with a tail wind in tall crop conditions. If the crop material were to be engaged for a significant period of time before severing were to take place this would cause, due to the upward inclination of the belts 40, a downward force on the belts that could cause them to be damaged or pulled from their sprockets.

The row crop unit as described above is in addition adjustable for various row spacings, and is suitable for use with tangled and down crops due to the provision of the floating snouts 30.

What is claimed is:

1. A row crop unit for a crop harvesting machine comprising:

a pair of fore-and-aft extending side by side endless molded crop gathering belts;

a drive sprocket associated with the rear end of each of the crop gathering belts;

a plurality of idler assemblies, each including an idler rotatably mounted on an idler shaft, a forward idler assembly being associated with the forward end of each of the crop gathering belts;

a frame assembly including a cross frame member and a plurality of forwardly extending frame members supporting only the upper ends of the idler shafts whereby said frame assembly does not extend below the idlers, the rear ends of the forwardly extending frame members being connected to the cross frame member;

first drive means associated with the frame and including drive shafts on which the drive sprockets are mounted, the first drive means being capable of causing the endless crop gathering belts to be driven;

cutting means disposed behind the forward end of the molded crop gathering belts; and second drive means capable of driving the cutting means.

2. A row crop unit as set forth in claim 1 wherein the forward idler and at least one rearward idler is associated with each of the belts, the forward idlers being spaced further away from each other than the rearward idlers to insure proper gathering of the crop material.

3. The row crop unit as set forth in claim 1 wherein the first drive means includes a cross shaft disposed in driving connection with the drive shafts, wherein the cutting means includes an oscillating sickle, and wherein the second drive means includes a pitman arm interconnecting the cross shaft with the sickle.

4. The row crop unit as set forth in claim 1 wherein at least one of said idler assemblies is provided with a belt retainer, said belt retainer being further provided with a scraper pin to facilitate the discharge of trash from the idler assembly.

5. The row crop unit as set forth in claim 1 wherein the frame assembly further includes laterally spaced apart fore-and-aft extending outrigger frames secured to the ends of the cross frame member, and a transversely extending frame member extending between the forward ends of the outrigger frames, said cutting means being supported by said transversely extending frame member.

6. The row crop unit as set forth in claim 5 wherein two pairs of cooperating crop gathering belts and two cutting means are provided, there being one cutting means for each pair of cooperating belts, both pairs of belts and said cutting means being disposed between the fore-and-aft extending outrigger frames.

7. The row crop unit as set forth in claim 5 wherein intermediate portions of the forwardly extending frame members are secured to said transversely extending frame member.

* * * * *